Patented June 18, 1929.

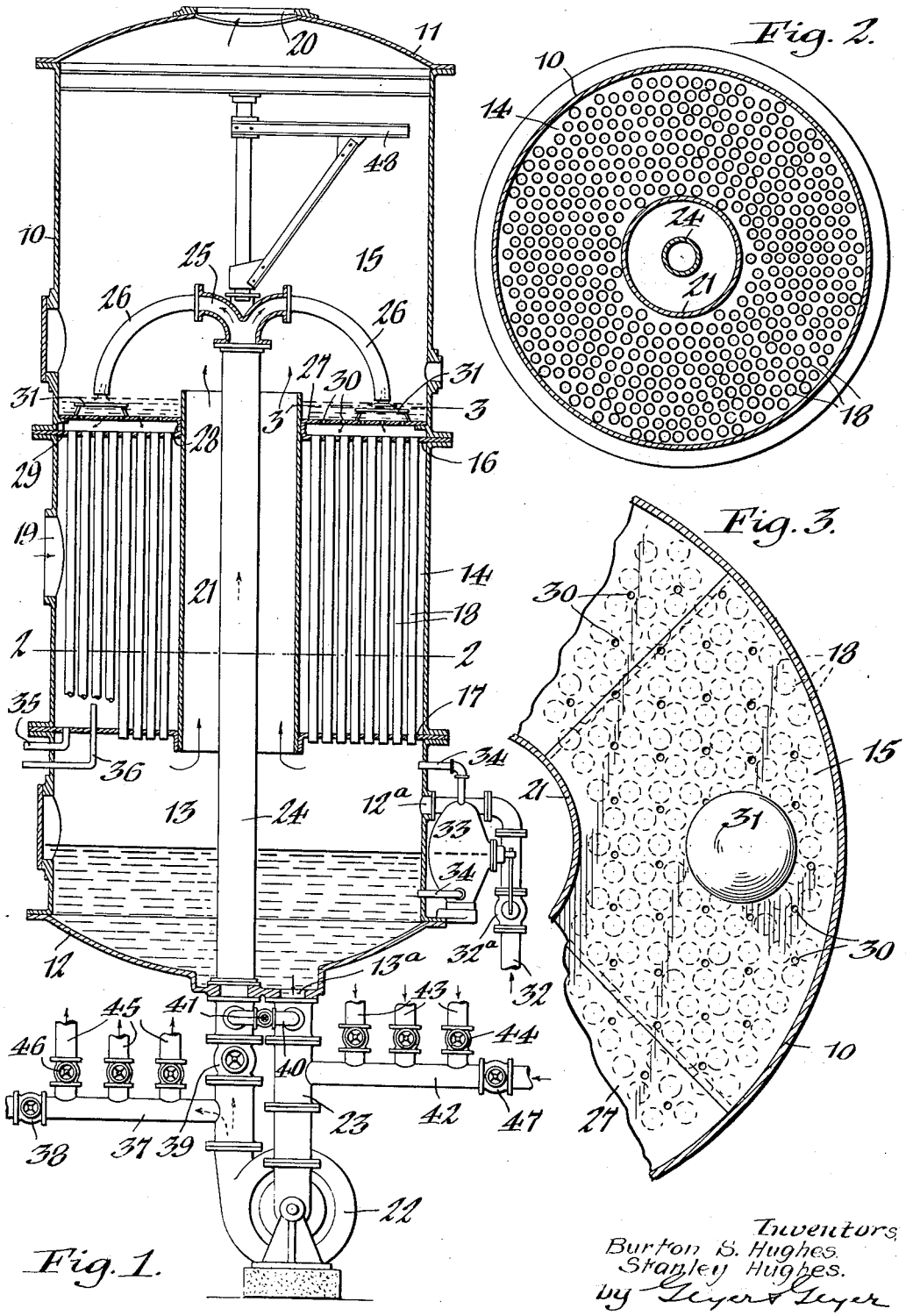

1,717,927

UNITED STATES PATENT OFFICE.

BURTON S. HUGHES AND STANLEY HUGHES, OF BUFFALO, NEW YORK.

EVAPORATOR.

Application filed March 8, 1926. Serial No. 93,090.

This invention relates to improvements in evaporators of the so-called film type.

Its chief objects are to provide an efficient evaporator of this character in which the solution being concentrated is free from any hydrostatic head while boiling, which has a large steam disengaging surface, and wherein the separation of the vapor from the boiling liquid is effective and complete.

Another object of the invention is the provision of an evaporator which is simple and compact in construction and requires a minimum of floor space, which is accessible for cleaning and repairing, and which can be manufactured at a moderate cost.

In the accompanying drawings:

Figure 1 is a sectional elevation of an evaporator embodying our improvements. Figures 2 and 3 are horizontal sections on the correspondingly-numbered lines in Fig. 1.

Similar characters of reference indicate corresponding parts throughout the several views.

In the preferred construction of the evaporator shown in the drawings, the same consists of a cylindrical body 10 having heads 11 and 12 applied to its upper and lower ends. This body is divided horizontally into three compartments 13, 14 and 15 disposed vertically in line one above the other. The lower compartment or chamber 13 has an inlet 12$^a$ and an outlet 13$^a$ for the juice, this chamber being of a suitable size to contain a supply of juice to be concentrated and also to furnish a space above the normal juice-level for permitting the separation of the vapor from the juice. The central compartment or steam chest 14, which constitutes the heating unit of the apparatus for boiling or evaporating the juices, is separated from the adjoining upper and lower compartments by partitions or tube sheets 16, 17 and contained therein is the heating surface consisting of a plurality of vertical tubes 18 wherein the juice is boiled and which extend through and are expanded into said sheets. In its side the heating compartment has an inlet 19 for the admission of steam. The lower ends of the tubes open into the juice-chamber 13 and their upper ends open into the chamber 15 which is comparatively large for effecting the final separation of the juice from the vapor and which also affords sufficient head room for cleaning the tubes by passing a scrubber through them and for removing and replacing tubes when necessary. The head 11 of this upper chamber has a vapor outlet 20 which may communicate with a succeeding effect or suitable condenser, not shown.

Extending centrally through the steam compartment 14 and opening at its ends into the chambers 13 and 15, respectively, is a cylindrical shell or tube 21 which is securely connected to the tube-sheets 16, 17 to form a steam tight joint therewith. This tube projects a suitable distance above the upper tube-sheet 16 and serves as a passage for conducting the vapors from the boiling juice upwardly into the separating chamber 15 and thence through the outlet 20 to the condenser or to the adjoining unit of a multiple effect evaporator.

A centrifugal pump 22 of any suitable and well-known construction is provided for drawing the juice from the lower chamber 13 and delivering it to the upper chamber 15, from whence it flows downward by gravity through the tubes 18. This pump is preferably located beneath the evaporator-body, its inlet or suction end being connected by a pipe 23 with the juice-outlet 13$^a$ in the lower head 12, while its outlet or discharge side is connected with a delivery pipe or conduit 24 extending upwardly through the vapor-tube 21 and into the upper chamber 15. At its upper end the pipe 24 is provided with a distributing head 25 from which radiate a plurality of downwardly-curved branch pipes 26 for delivering the juice into the lower end of the upper chamber 15. Disposed horizontally in the latter between its bottom or upper tube sheet 16 and the outlet ends of the delivery pipes 26 is a distributing plate 27 of sheet steel or other suitable material and properly reinforced to prevent its distortion. This plate is made in three or more detachable sections, depending on the size of the evaporator, and is supported at its inner and outer edges on rings 28, 29 applied to the evaporator-body and vapor tube 21, respectively, as shown in Fig. 1. Holes or perforations 30 in this plate permit the flow of juice therethrough into the steam-heated tubes 18 whose upper ends are flush with or slightly below the surface of the upper tube-sheet to insure uniform distribution of the juice to the several tubes. The holes in the distributing plate are so disposed that the falling streams of juice will impinge on the triangular spaces formed between the tubes 18 in the customary 60° tube-sheet layout, thus causing the juice to spread on the top surface of the tube-sheet and flow downwardly through the tubes in a thin film adhering to the interior thereof. In practice, it has been found that adequate distribution of the juice to the tubes of ordinary size is had by providing one hole in the plate 27 for each group of 3 tubes, as shown in Fig. 3.

In order to avoid violent commotion of the juice as it is discharged from the pipes 26 on to the distributing plate 27, splash plates 31 are provided. They are preferably mounted on the distributing plate above the surface thereof and opposite the discharge ends of the delivery pipes to receive the impact of the juice and to spread it laterally therefrom.

The juice to be evaporated is fed to the lower chamber 15 through a supply pipe 32 connected with the inlet 12ª and containing a suitable valve 32ª. For the purpose of maintaining a constant level of juice in this evaporator-chamber, the valve is controlled by a suitable float actuated device, of any well-known construction, contained within a float chamber 33 arranged at the lower side of the evaporator and connected at its upper and lower ends by pipes 34 with the juice-chamber 13. Thus, as the juice level in the evaporator varies, the level thereof in the float-chamber is correspondingly changed and the valve 32ª is accordingly opened or closed to admit or prevent the flow of juice into the evaporator.

Water resulting from the condensation of steam used for heating is discharged through a drain pipe 35 extending through the bottom tube-sheet 17, while the non-condensible gases carried in with the steam are removed through a vent pipe 36 also extending through the bottom tube-sheet and having its upper or inlet end located above said sheet to prevent the water being drained off with the gases.

The juice, when concentrated to the required density, is withdrawn from the evaporator through the discharge side of the centrifugal circulating pump 22. To this end, an outlet pipe 37 extends laterally from the lower end of the pump-discharge pipe 24 and is provided with a valve 38 for regulating the flow of the concentrated juice therefrom. Arranged in the pump-discharge pipe above the juice-outlet pipe 37 is a valve 39 for regulating the flow of juice either into the evaporator or through said outlet pipe, this valve being open during the concentrating operation and closed when withdrawing the concentrated juice from the evaporator. In order to discharge the concentrated juice remaining in that part of the pipe 24 above its valve 39, a by-pass or pipe 40 containing a valve 41 connects said pipe 24 with the pump-intake pipe 23, this valve being opened to effect the discharge of the juice through the pump 22 and closed during the concentrating operation.

It is necessary, when concentrating certain juices, to thoroughly cleanse the evaporator from time to time to maintain the heating unit in proper condition. This is accomplished by providing an inlet pipe 42 connected to the pump-intake pipe 23 and having a plurality of branch pipes 43 leading thereto, one being for the admission of water, one for soda solution and the other for an acid. Valves 44 are applied to these branch pipes for controlling the admission of the cleansing fluids to the evaporator. After being circulated through the latter, these fluids are discharged through corresponding branch pipes 45 connected with the outlet pipe 37 and equipped with valves 46. If rapid filling of the evaporator is desired, the juice to be concentrated may be admitted through the inlet pipe 42 provided at its end with a valve 47.

Located centrally in the upper chamber 15 above the distributing head 25 is a post crane 48 which serves as a means for conveniently handling the sections of the distributing plate 27 in large evaporators where such sections would have considerable weight and could not be lifted by hand. This crane also serves as a hanger for the tube-cleaners.

The operation of the improved apparatus is as follows:—

The juice is fed into the evaporator body through the float-controlled valve 32ª at such rate as to maintain a constant juice-level in the chamber 13. This juice is circulated upwardly through the pipe 24 by the centrifugal pump 22 on to the distributing plate 27 which is covered at all times to such depth as to insure a constant supply of juice to the heated tubes 18. Overflow of the juice into the vapor tube 21 is prevented by the extension thereof above the surface of the upper tube-sheet, as shown in Fig. 1. The juice passes downwardly through these tubes in a thin film adhering to the interior faces thereof and during its descent boils and finally drips into the bottom of the evaporator. The vapor issued from the boiling juice descends with it through the tubes, then ascends through the central tube 21 into the upper chamber 15, and thence through the outlet 20 into the succeeding evaporator unit or condenser. As evaporation proceeds, the juice is fed through the feed valve 32ª and is maintained at the required density by causing the circulating pump to continuously discharge the necessary quantity of concentrated juice.

In a multiple effect evaporator consisting of two or more evaporator units, such as herein shown and described, thin juice is fed into the first unit to maintain a constant level therein and this partially evaporated juice will pass successively to the other units through similar float-controlled feed valves without reference to the densities and without attention on the part of the operator. The final concentration of the juice in the last unit will, however, require frequent determinations of density, and the discharge rate of such concentrated juice varied from time to time to maintain the final density desired.

We claim as our invention:—

1. An evaporator of the character described, comprising a body having an upper chamber and a lower chamber, said lower chamber being adapted to contain the charge of material to be treated, a heating unit interposed between said chambers and including circulating tubes for the downward passage of material opening at their ends into said chambers, means extending upwardly through the evaporator-body for delivering the material from the lower chamber into the upper chamber, and a vapor discharge tube extending through the heating unit and opening at its upper and lower ends into said chambers, respectively.

2. An evaporator of the character described, comprising a body having a lower juice-receiving chamber, an upper separating chamber and an intermediate heating chamber, a conduit rising from the bottom of the evaporator-body through the aforesaid chambers for delivering the juice from said lower chamber into said upper chamber, tubes extending through and exposed to the heat in said heating chamber for conducting the juice in a thin film from the upper chamber into the lower chamber, a distributing plate arranged in the upper chamber below the conduit-outlet and extending over the open upper ends of said tubes, said plate having openings therein disposed out of axial alinement with the tubes, a circulating pump for forcing the juice upwardly through said conduit, and a vapor discharge tube communicating at its upper and lower ends with the separating chamber and the juice-receiving chamber, respectively, and extending through said heating chamber.

3. An evaporator of the character described, comprising a body having a lower juice-receiving chamber, an upper separating chamber and an intermediate heating chamber, a conduit rising from the bottom of the evaporator-body and extending through said heating chamber into said upper chamber for delivering the juice from said lower chamber into said upper chamber, tubes extending through and exposed to the heat in said heating chamber for conducting the juice in a thin film from the upper chamber into the lower chamber, a second conduit surrounding that portion of the first-named conduit extending through the heating chamber and connecting the lower chamber with the upper chamber for withdrawing the vapors issued from the juice while descending through the tubes, and a circulating pump connected to said first-named conduit.

4. An evaporator of the character described, comprising a body having an upper chamber and a lower chamber, said lower chamber being adapted to contain the charge of material to be treated, a heating unit interposed between said chambers and including circulating tubes for the downward passage of the material, a vapor discharge conduit extending through the heating unit and opening at its ends into the upper and lower chambers, respectively, means extending through said vapor conduit for conducting the material from the lower chamber to the upper chamber, and a circulating pump connected to the lower end of said conducting means.

5. An evaporator of the character described, comprising a body having a lower juice-receiving chamber, an upper separating chamber and an intermediate heating chamber, upper and lower tube sheets separating the several chambers from one another, a vapor discharge conduit extending through the heating chamber and opening at its ends into the upper and lower chambers, respectively, tubes arranged in the heating chamber between the tube-sheets and surrounding said vapor conduit for conducting the juice from the upper chamber to the lower chamber, and means extending through the vapor conduit for conducting the juice from the lower chamber into the upper chamber, said vapor conduit projecting above the surface of the upper tube-sheet to form a retaining wall to prevent the juice flowing into the same.

6. An evaporator of the character described, comprising a body having a lower juice-receiving chamber, an upper separating chamber and an intermediate heating chamber, upper and lower tube sheets separating the several chambers from one another, a vapor discharge conduit extending through the heating chamber and opening at its ends into the upper and lower chambers, respectively, tubes arranged in the heating chamber between the tube-sheets and surrounding said vapor conduit for conducting the juice from the upper chamber to the lower chamber, a circulating pump having its inlet end communicating with the juice-receiving chamber, and a juice-discharge pipe connected with the pump-outlet and extending upwardly through said vapor-conduit into the separating chamber.

7. An evaporator of the character described, comprising a body having a lower juice-receiving chamber, an upper separating chamber and an intermediate heating chamber, upper and lower tube sheets separating the several chambers from one another, a vapor discharge conduit extending through the heating chamber and opening at its ends into the upper and lower chambers, respectively, tubes arranged in the heating chamber between the tube-sheets and surrounding said vapor conduit for conducting the juice from the upper chamber to the lower chamber, the upper end of said vapor conduit projecting above the surface of the upper tube-sheet, a perforated distributing plate arranged in the bottom of the separating chamber over the upper ends of said juice-conducting tubes, a circulating pump having its inlet end communicating with the juice-receiving chamber, and a juice-discharge pipe connected with the pump outlet and extending upwardly through said vapor-conduit into the separating chamber.

8. An evaporator of the character described, comprising a body having a lower juice-receiving chamber, an upper separating chamber and an intermediate heating chamber, upper and lower tube sheets separating the several chambers from one another, a vapor discharge conduit extending through the heating chamber and opening at its ends into the upper and lower chambers, respectively, tubes arranged in the heating chamber between the tube-sheets and surrounding said vapor conduit for conducting the juice from the upper chamber to the lower chamber, the upper end of said vapor conduit projecting above the surface of the upper tube-sheet, a perforated distributing plate arranged in the bottom of the separating chamber over the upper ends of said juice-conducting tubes, a circulating pump having its inlet end communicating with the juice-receiving chamber, a juice-discharge pipe connected with the pump outlet and extending upwardly through said vapor-conduit into the separating chamber, the upper end of the juice-discharge pipe terminating in a plurality of downwardly-curved branches for delivering the juice on to said distributing plate, and splash plates disposed above the distributing plate and opposite the outlet ends of said discharge-pipe branches.

9. An evaporator of the character described, comprising a vertical body divided horizontally into a lower juice-receiving chamber having an inlet and an outlet, an upper separating chamber and an intermediate heating chamber, tubes extending through said heating chamber and opening at their opposite ends into said upper and lower chambers, respectively, a circulating pump arranged exterior to the evaporator-body and having its inlet end communicating with the outlet of the juice-receiving chamber, a conduit connected with the pump-outlet and extending upwardly through said body for conducting the juice from the lower chamber to the upper chamber, a valve in said conduit for controlling the flow of juice through the same, said conduit also having a valved-outlet for the concentrated juice disposed between said controlling valve and the outlet end of the pump, and a by-pass containing a valve for effecting the drainage of concentrated juice from said conduit, said by-pass connecting the lower end of the latter with the pump-inlet and being located above the controlling valve thereof.

10. An evaporator of the character described, comprising a cylindrical body having a lower juice-receiving chamber having an inlet and an outlet, an upper separating chamber having a vapor outlet, and an intermediate heating chamber, upper and lower tube-sheets separating the several chambers from one another, means for maintaining a constant level of juice in said receiving chamber, a vapor discharge tube arranged centrally of the evaporator-body and extending through the tube-sheets, vertical tubes extending through the heating chamber for conducting the juice in a thin film from the upper chamber to the lower chamber, a circulating pump having its inlet end connected with the outlet of said juice-receiving chamber, a juice delivery pipe extending from the bottom of the evaporator-body upwardly through said vapor-tube into the separating chamber, the lower end of said delivery pipe being connected with the pump-outlet and its upper end terminating in downwardly-directed branches, a distributing plate arranged in the separating chamber below the outlet ends of said delivery pipe-branches and extending over the juice-heating tubes, and means for controlling the discharge of concentrated juice from the lower chamber.

BURTON S. HUGHES.
STANLEY HUGHES.